US012748507B2

(12) United States Patent
Lee et al.

(10) Patent No.: US 12,748,507 B2
(45) Date of Patent: Sep. 29, 2026

(54) APPARATUS, DEVICE, AND METHOD FOR ADAPTING SENSITIVITY OF ELECTRODE PAIRS IN A MUTUAL CAPACITANCE SENSING GRID

(71) Applicant: STMicroelectronics International N.V., Geneva (CH)

(72) Inventors: Chang Woo Lee, Hwasung-si (KR); Ildo Park, Bucheon-Si (KR); Myung Hyun Hwang, SeongNam (KR)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 190 days.

(21) Appl. No.: 18/655,933

(22) Filed: May 6, 2024

(65) Prior Publication Data

US 2025/0341912 A1 Nov. 6, 2025

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC .. G06F 3/04166; G06F 3/0418; G06F 3/0446; G06F 3/041662; G01R 31/2891
See application file for complete search history.

(56) References Cited

U.S. PATENT DOCUMENTS

| | | | |
|---|---|---|---|
| 8,743,060 B2 | 6/2014 | Hotelling | |
| 9,551,904 B2 | 1/2017 | Philipp | |
| 10,101,847 B2 | 10/2018 | Ding et al. | |
| 10,209,828 B2 | 2/2019 | Kang et al. | |
| 10,795,493 B2 | 10/2020 | Kang et al. | |
| 10,996,792 B2 | 5/2021 | Yun et al. | |
| 11,662,844 B2 | 5/2023 | Yeh et al. | |
| 11,822,753 B2 | 11/2023 | Lee et al. | |
| 2013/0169584 A1* | 7/2013 | Konradi | G06F 3/04166 345/174 |
| 2016/0062501 A1* | 3/2016 | Hsu | G06F 3/04883 345/174 |

(Continued)

FOREIGN PATENT DOCUMENTS

CN 107291303 B 9/2020

*Primary Examiner* — Lee E Rodak
*Assistant Examiner* — Demetrius R Pretlow
(74) *Attorney, Agent, or Firm* — Alston & Bird LLP

(57) ABSTRACT

An example apparatus, computer-implemented method, and electronic device for determining an adjusted strength of a touch event at a mutual capacitance touch-sensitive surface are provided. An example apparatus includes a mutual capacitance sensing grid, having a plurality of electrode pairs, each with a transmitting electrode and a receiving electrode. The apparatus further includes a sensing grid controller coupled to the sensing grid and configured to determine an ambient sensing value for each electrode pair in an untouched state. The sensing grid controller is further configured to identify a touch event and a touch strength at the electrode pair based on a change in a sensing value. The apparatus is further configured to determine an adapted touch strength corresponding to the first electrode pair, based at least in part on the first ambient sensing value.

18 Claims, 10 Drawing Sheets

(56) References Cited

U.S. PATENT DOCUMENTS

| | | | | |
|---|---|---|---|---|
| 2016/0282999 | A1* | 9/2016 | Hwang | G01L 7/024 |
| 2018/0059866 | A1* | 3/2018 | Drake | G06F 3/0446 |
| 2018/0081466 | A1* | 3/2018 | Moon | G06F 3/04166 |

* cited by examiner

880

APPARATUS, DEVICE, AND METHOD FOR ADAPTING SENSITIVITY OF ELECTRODE PAIRS IN A MUTUAL CAPACITANCE SENSING GRID

TECHNOLOGICAL FIELD

Embodiments of the present disclosure relate generally to mutual capacitance touchscreens, and more specifically to adapting the sensitivity of electrode pairs in a mutual capacitance sensing grid of a mutual capacitance touch surface.

BACKGROUND

Touch-sensitive surfaces have become a common interface option in many electronic devices. Smartphones, tablets, PCs, appliances, and many other electronic devices provide a touch-sensitive surface to receive input from users. Capacitive touch-sensitive surfaces are one popular mechanism utilized to implement a touch-sensitive interface. Mutual capacitance touch-sensitive surfaces utilize a grid of electrode pairs, each exhibiting a unique capacitance between the pair of electrodes, to detect touch events. Mutual capacitance touch-sensitive surfaces work by detecting the change in capacitance caused by the touch of an object between the pair of electrodes.

Applicant has identified many technical challenges and difficulties associated with determining the touch strength of a touch event on a mutual capacitance touch-sensitive surface. Through applied effort, ingenuity, and innovation, Applicant has solved problems related to determining the touch strength by developing solutions embodied in the present disclosure, which are described in detail below.

BRIEF SUMMARY

Various embodiments are directed to an example apparatus, computer-implemented method, and electronic device for determining an adjusted strength of a touch event at a mutual capacitance touch-sensitive surface. An example apparatus may comprise a mutual capacitance sensing grid, comprising a plurality of electrode pairs, each electrode pair comprising a transmitting electrode and a receiving electrode, including at least a first electrode pair comprising a first transmitting electrode and a first receiving electrode. The example apparatus may further comprise a sensing grid controller electrically coupled to the mutual capacitance sensing grid, comprising one or more processors and one or more storage devices storing instructions that are operable when executed by the one or more processors to determine an ambient sensing value for each electrode pair in the plurality of electrode pairs, including at least a first ambient sensing value corresponding to the first electrode pair, wherein the ambient sensing value corresponds to a measured electrical characteristic between the transmitting electrode and the receiving electrode in an untouched state; identify a touch event at the first electrode pair based on a change in a sensing value between the first transmitting electrode and the first receiving electrode; determine a touch strength corresponding to the touch event based on the change in the sensing value; and determine an adapted touch strength corresponding to the first electrode pair, wherein the adapted touch strength is based at least in part on the first ambient sensing value.

In some embodiments, the measured electrical characteristic corresponds to a capacitance between the transmitting electrode and the receiving electrode.

In some embodiments, the sensing grid controller is further configured to determine a baseline sensing value for the first electrode pair based at least in part on a plurality of historical sensing values for the first electrode pair, wherein the plurality of historical sensing values for the first electrode pair are measured in an untouched state.

In some embodiments, the baseline sensing value comprises an average of the plurality of historical sensing values for the electrode pair.

In some embodiments, the sensing value corresponds to a capacitance between the first transmitting electrode and the first receiving electrode.

In some embodiments, the sensing grid controller is configured to determine a raw sensing value corresponding to the sensing value of the first electrode pair, wherein the touch strength of the touch event of the first electrode pair is a difference between the raw sensing value and the baseline sensing value.

In some embodiments, the adapted touch strength is proportional to a ratio of the touch strength and the ambient sensing value.

In some embodiments, the plurality of electrode pairs of the mutual capacitance sensing grid are configured in one or more electrode pair rows and one or more electrode pair columns.

In some embodiments, the mutual capacitance sensing grid comprises at least a first electrode pair row comprising one or more first row electrode pairs of the plurality of electrode pairs; and a second electrode pair row comprising one or more second row electrode pairs of the plurality of electrode pairs.

In some embodiments, the apparatus further comprises a mutual sensing transmit data line electrically coupled to the mutual capacitance sensing grid and the sensing grid controller. In some embodiments, the sensing grid controller is further configured to: cause the mutual sensing transmit data line to transmit a first electrical pulse to each of the first row electrode pairs during a first time period, and cause the mutual sensing transmit data line to transmit a second electrical pulse to each of the second row electrode pairs during a second time period.

In some embodiments, the apparatus further comprises a mutual sensing receive data line electrically coupled to the mutual capacitance sensing grid and the sensing grid controller. In some embodiments, the sensing grid controller is further configured to receive, from the mutual sensing receive data line, the first electrical pulse from each of the first row electrode pairs during the first time period, and receive, from the mutual sensing receive data line, the second electrical pulse from each of the second row electrode pairs during the second time period.

In some embodiments, a location of the touch event is determined based on the sensing value of each electrode pair in the plurality of electrode pairs.

A computer-implemented method for determining an adapted touch strength of a touch event at a mutual capacitance touch-sensitive surface is also provided. In some embodiments, the computer-implemented method comprises: determining, at a sensing grid controller, an ambient sensing value for each electrode pair in a plurality of electrode pairs comprising a mutual capacitance sensing grid, including at least a first ambient sensing value corresponding to a first electrode pair, wherein the ambient sensing value corresponds to a measured electrical characteristic between a transmitting electrode of the electrode pair and a receiving electrode of the electrode pair in an untouched state. In some embodiments, the method further comprises identifying a touch event at the first electrode pair based on a change in a sensing value between the first transmitting electrode and the first receiving electrode; determining a touch strength corresponding to the touch event based on the change in the sensing value; and determining an adapted touch strength corresponding to the first electrode pair, wherein the adapted touch strength is based at least in part on the first ambient sensing value.

In some embodiments, the computer-implemented method further comprises determining a baseline sensing value for the first electrode pair based at least in part on a plurality of historical sensing values for the first electrode pair, wherein the plurality of historical sensing values for the first electrode pair are measured in an untouched state.

In some embodiments, the sensing value and the ambient sensing value correspond to a capacitance between the first transmitting electrode and the first receiving electrode.

In some embodiments, the computer-implemented method further comprises determining a raw sensing value corresponding to the sensing value of the first electrode pair, wherein the touch strength of the touch event of the first electrode pair is a difference between the raw sensing value and the baseline sensing value.

In some embodiments, the adapted touch strength is proportional to a ratio of the touch strength and the ambient sensing value.

In some embodiments, the plurality of electrode pairs of the mutual capacitance sensing grid are configured in one or more electrode pair rows and one or more electrode pair columns, comprising at least: a first electrode pair row comprising one or more first row electrode pairs of the plurality of electrode pairs; and a second electrode pair row comprising one or more second row electrode pairs of the plurality of electrode pairs; and wherein the computer-implemented method further comprises: causing a mutual sensing transmit data line to transmit a first electrical pulse to each of the first row electrode pairs during a first time period, wherein the mutual sensing transmit data line is electrically coupled to the mutual capacitance sensing grid and the sensing grid controller; causing the mutual sensing transmit data line to transmit a second electrical pulse to each of the second row electrode pairs during a second time period; receiving, from a mutual sensing receive data line, the first electrical pulse from each of the first row electrode pairs during the first time period, wherein the mutual sensing receive data line is electrically coupled to the mutual capacitance sensing grid and the sensing grid controller; and receiving, from the mutual sensing receive data line, the second electrical pulse from each of the second row electrode pairs during the second time period.

In some embodiments, a location of the touch event is determined based on the sensing value of each electrode pair in the plurality of electrode pairs.

An example electronic device is also provided. In some embodiments, the example electronic device comprises: a touch-sensitive surface, the touch-sensitive surface comprising: a mutual capacitance sensing grid, comprising a plurality of electrode pairs, each electrode pair comprising a transmitting electrode and a receiving electrode, including at least a first electrode pair comprising a first transmitting electrode and a first receiving electrode; a sensing grid controller electrically coupled to the mutual capacitance sensing grid, comprising one or more processors and one or more storage devices storing instructions that are operable when executed by the one or more processors to: determine an ambient sensing value for each electrode pair in the plurality of electrode pairs, including at least a first ambient sensing value corresponding to the first electrode pair, wherein the ambient sensing value corresponds to a measured electrical characteristic between the transmitting electrode and the receiving electrode in an untouched state; identify a touch event at the first electrode pair based on a change in a sensing value between the first transmitting electrode and the first receiving electrode; determine a touch strength corresponding to the touch event based on the change in the sensing value; and determine an adapted touch strength corresponding to the first electrode pair, wherein the adapted touch strength is based at least in part on the first ambient sensing value.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
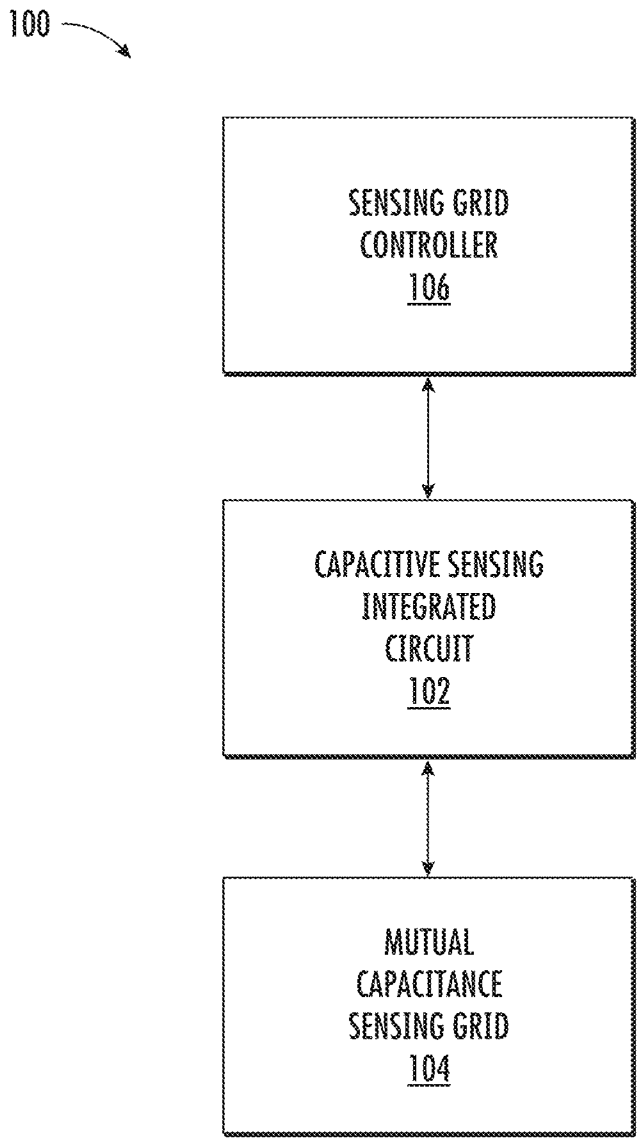
FIG. 1 illustrates a block diagram of a mutual capacitance touch-sensitive surface in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with determining a stable and consistent touch strength of a touch event on a touch-sensitive surface. As understood by those of skill in the field to which the present disclosure pertains, there are numerous example scenarios in which a stable and consistent touch strength at a touch-sensitive surface may be desired.

Touch-sensitive surfaces have become a common interface option in most electronic devices. Smartphones, tablets, personal computers (PCs), appliances, and many other electronic devices provide one or more touch-sensitive surfaces to receive input from users. Capacitive touch-sensitive surfaces are one popular mechanism utilized to implement a touch-sensitive interface on an electronic device. Capacitive touch-sensitive surfaces come in two types, self-capacitance touch-sensitive surfaces and mutual capacitance touch-sensitive surfaces. Self-capacitance touch-sensitive surfaces measure the capacitance of a single electrode relative to ground. The presence of an object, such as a finger of a user, near the single electrode causes a measurable change in the capacitance of the electrode, which may be detected by a controller monitoring the capacitance of the electrode.

Mutual capacitance touch-sensitive surfaces utilize a mutual capacitance sensing grid of electrode pairs to detect touch events. Each electrode pair of the mutual capacitance sensing grid exhibits a unique sensing value (e.g., charge or capacitance) between the pair of electrodes. Mutual capacitance touch-sensitive surfaces work by detecting a change in the sensing value caused by the touch of an object at or near the pair of electrodes. In some embodiments, the mutual capacitance sensing grid may include electrodes that are coated with a transparent conductor, such as indium tin oxide. When an object, such as a finger, touches the touch-sensitive surface, the sensing values of electrode pairs near the object are altered. The position of the touch event may be determined by pin-pointing the change in sensing value at one or more electrode pairs within the mutual capacitance sensing grid.

Mutual capacitance touch-sensitive surfaces provide a number of advantages over a number of touch-sensitive solutions. For example, mutual capacitance touch-sensitive surfaces enable support for multiple simultaneous touch events. In addition, mutual capacitance touch-sensitive surfaces exhibit good optical clarity. Further, mutual capacitance touch-sensitive surfaces are more sensitive to light touch, so they may be used with a finger or a stylus. Mutual capacitance touch-sensitive surfaces are also more durable and more resistant to wear and tear. Additionally, mutual capacitance touch-sensitive surfaces are less susceptible to interference from electromagnetic fields.

However, mutual capacitance touch-sensitive surfaces may suffer from deviation of sensitivity. The electrodes within the mutual capacitance sensing grid may have different electrical properties (e.g., electrical resistance) based on size, the grid pattern, the location of the electrode on the integrated circuit, and so on. Differences in electrical properties of electrodes may lead to differences in strength measurements, and/or sensitivity, based on the particular electrical properties of the electrode, even in an instance in which the touch event is identical. Differences in sensitivity may affect the accuracy and consistency of a touch screen.

The various example embodiments described herein utilize various techniques to adapt the strength measurements of a particular electrode pair based on the electrical properties of the electrode pair. For example, in some embodiments, an ambient sensing value may be determined for each electrode pair in the plurality of electrode pairs within the mutual capacitance sensing grid in an instance in which the electrode pair is in an untouched state. An ambient sensing value refers to a measured electrical characteristic between two electrodes comprising an electrode pair in an instance in which no conductive object, such as a finger, is proximate the electrode pair. The electrical characteristic associated with the ambient sensing value may correspond with a capacitance, charge, voltage between the two electrodes, electrical field between the two electrodes, and so on. The ambient sensing value for each electrode pair in the plurality of electrode pairs within the mutual capacitance sensing grid may be measured and stored.

In some embodiments, during operation, the ambient sensing value of an electrode pair may be used to adapt the measured strength at the electrode pair. For example, a sensing grid controller may determine a strength of a touch event by computing the difference between a baseline sensing value and a raw sensing value at a particular electrode pair. However, as discussed herein, the strength may be differ based on the electrical properties of the electrode pair. By adapting the measured strength based on the ambient sensing value stored for the specific electrode pair, the differences in strength may be normalized. Thus, strength measurements are stabilized across the mutual capacitance sensing grid. Stabilized strength measurements based on the ambient sensing value may improve the accuracy and consistency of an electronic device utilizing a mutual capacitance touch-sensitive surface.

As a result of the herein described example embodiments and in some examples, the stability of touch strength measurements on a touch-sensitive surface may improved. As a consequence, the accuracy of strength measurements on a touch-sensitive surface may be increased.

Referring now to FIG. 1, an example mutual capacitance touch-sensitive surface 100 is provided. As depicted in FIG. 1, the example mutual capacitance touch-sensitive surface 100 includes a sensing grid controller 106 electrically coupled to a capacitive sensing integrated circuit (IC) 102. In addition, the capacitive sensing IC 102 is electrically coupled to a mutual capacitance sensing grid 104.

As depicted in FIG. 1, the example mutual capacitance touch-sensitive surface 100 includes a sensing grid controller 106. A sensing grid controller 106 comprises one or more computing devices electrically coupled to the capacitive sensing IC 102 and configured to initiate and measure electrical characteristics of each electrode pair comprising the mutual capacitance sensing grid 104. For example, the sensing grid controller 106 is configured to measure the ambient frequency of each of the electrode pairs comprising the mutual capacitance sensing grid 104. A sensing grid controller 106 may utilize any techniques to determine electrical characteristics of the electrode pairs. For example, a sensing grid controller 106 may transmit a signal comprising particular electrical properties, such as a particular voltage, and determine the electrical characteristics of the electrode pairs based on the received signal. The determination of the electrical characteristics of the electrode pairs is described further in relation to FIG. 3 and FIG. 5. An example sensing grid controller 106 architecture is described further in relation to FIG. 2.

Figure 3:
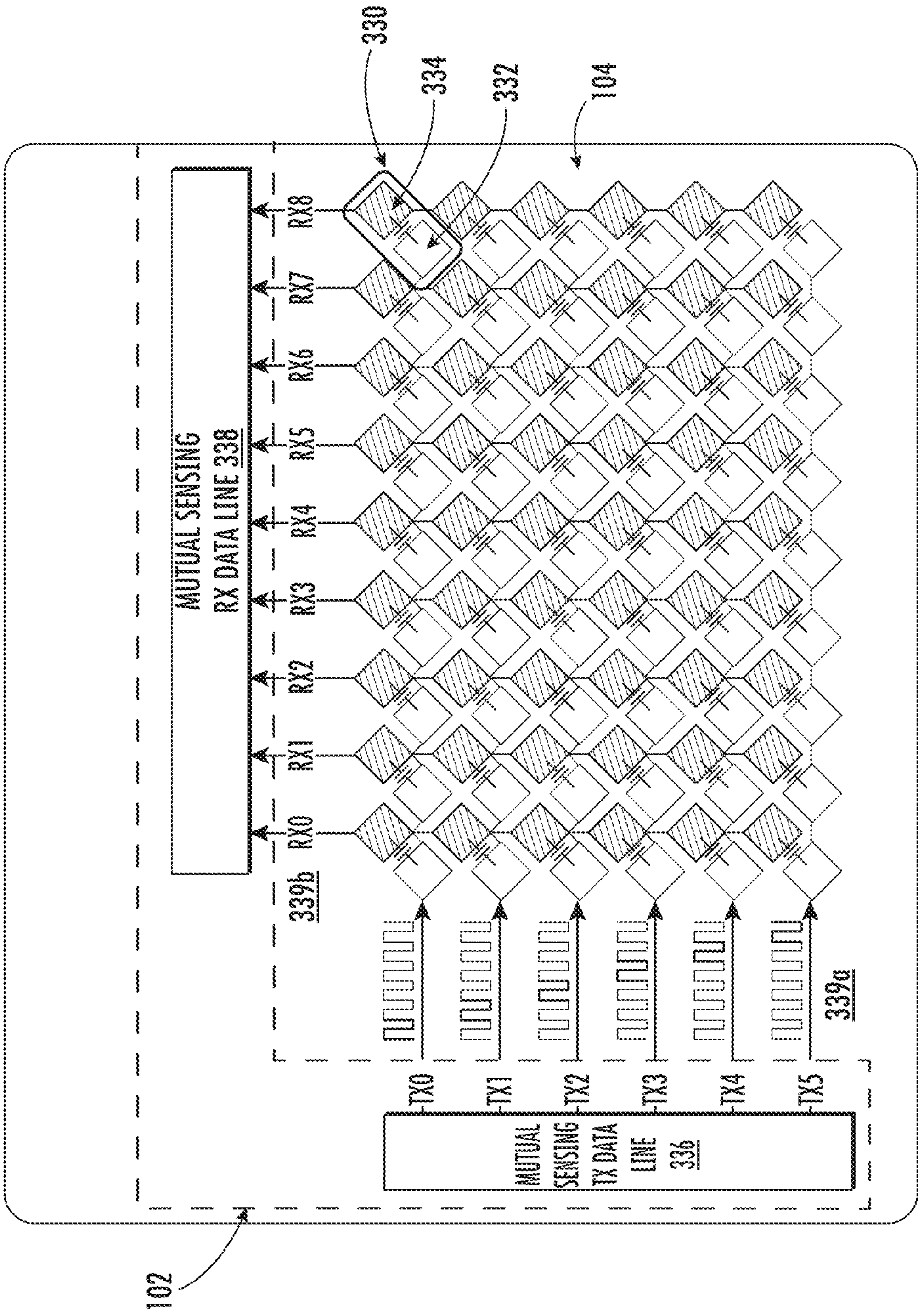
FIG. 3 illustrates an example block diagram of a mutual capacitance sensing grid in accordance with an example embodiment of the present disclosure.

As further depicted in FIG. 1, the example mutual capacitance touch-sensitive surface 100 includes a capacitive sensing IC 102. The capacitive sensing IC 102 comprises circuitry including hardware and/or software configured to generate one or more sensing signals to be transmitted to each electrode pair in the mutual capacitance sensing grid 104. The capacitive sensing IC 102 may be configured to transmit sensing signals based on configuration and/or input provided by the sensing grid controller 106. For example, certain properties of the transmitted sensing signals may be adjusted, such as, voltage, current, frequency, amplitude, period, and so on. In addition, the capacitive sensing IC 102 may be configured to receive returned sensing signals and measure electrical characteristics related to the returned sensing signals. Based on the electrical characteristics of the returned sensing signals, one or more sensing values related to each electrode pair may be determined. As depicted in FIG. 3, the capacitive sensing integrated circuit 102 may include mutual sensing transmission data line circuitry (e.g., mutual sensing transmission data line 336) and mutual sensing receiving data line circuitry (e.g., mutual sensing receiving data line 338).

As further depicted in FIG. 1, the mutual capacitance touch-sensitive surface 100 includes a mutual capacitance sensing grid 104. A mutual capacitance sensing grid 104 comprises any plurality of conductive materials configured to form a two-dimensional array of capacitive features across at least a portion of the mutual capacitance touch-sensitive surface 100. For example, the mutual capacitance sensing grid 104 may include two sets of parallel conductive strips or wires separated by a dielectric (e.g., air, or other dielectric material). The two sets of parallel conductive strips or wires may be positioned perpendicular to each other, forming a grid of conductive strips or wires. Each intersection of the grid may exhibit a capacitance. In another example, a plurality of conductive pads or plates may be positioned in pairs, forming a two-dimensional grid pattern across at least a portion of the mutual capacitance touch-sensitive surface 100. The capacitance of each capacitive feature may be measured utilizing the capacitive sensing IC 102. An example mutual capacitance sensing grid 104 is further described in relation to FIG. 3.

Figure 2:
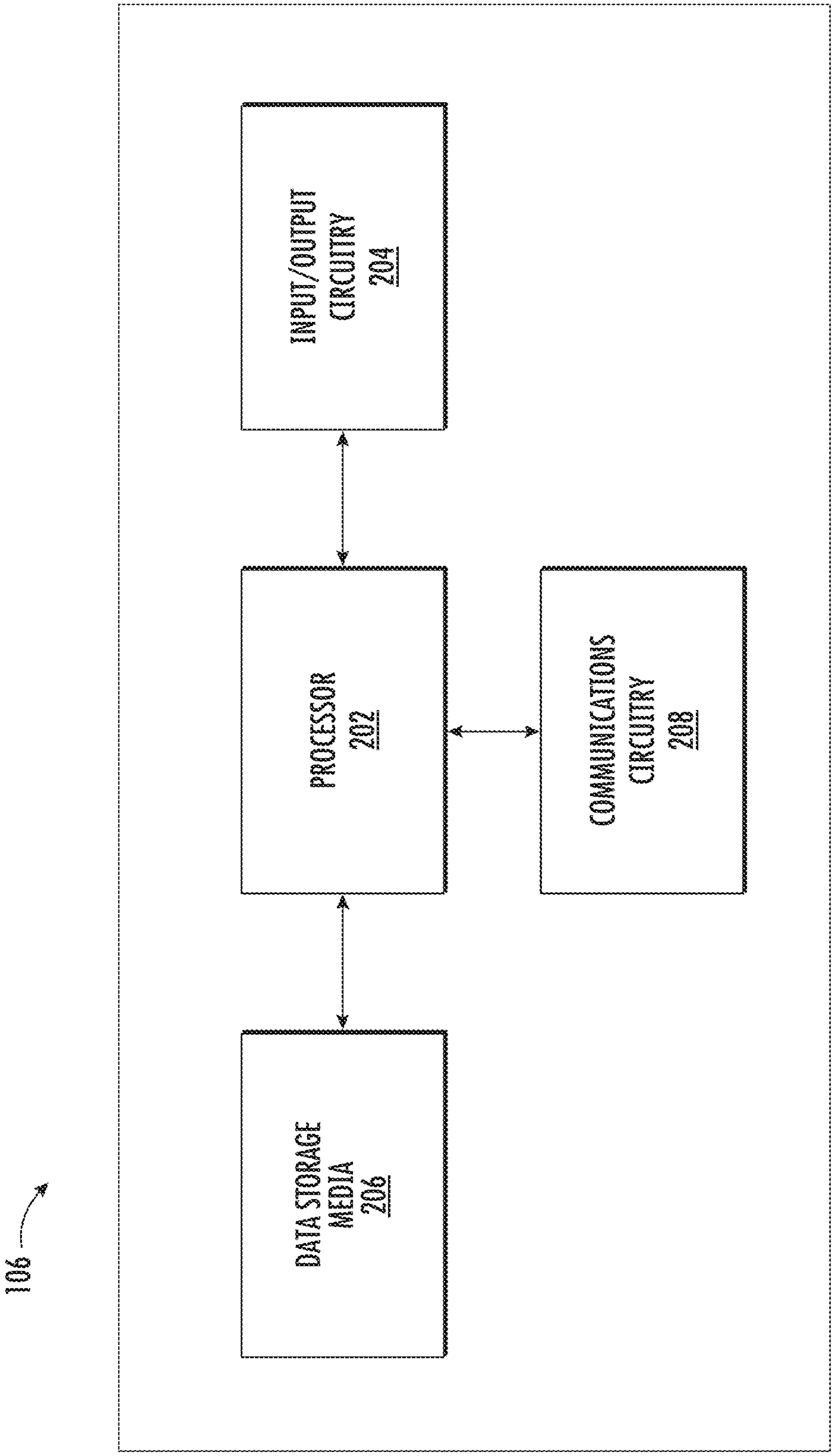
FIG. 2 illustrates an example block diagram of a sensing grid controller in accordance with an example embodiment of the present disclosure.

Referring now to FIG. 2, FIG. 2 illustrates an example sensing grid controller 106 in accordance with at least some example embodiments of the present disclosure. The sensing grid controller 106 includes processor 202, input/output circuitry 204, data storage media 206, and communications circuitry 208. In some embodiments, the sensing grid controller 106 is configured, using one or more of the sets of circuitry 202, 204, 206, and/or 208, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the sensing grid controller 106 provide or supplement the functionality of other particular sets of circuitry. For example, the processor 202 in some embodiments provides processing functionality to any of the sets of circuitry, the data storage media 206 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the data storage media 206 via a bus for passing information among components of the sensing grid controller 106. In some embodiments, for example, the data storage media 206 is non-transitory and may include, for example, one or more volatile and/or non-volatile memories. In other words, for example, the data storage media 206 in some embodiments includes or embodies an electronic storage device (e.g., a computer readable storage medium). In some embodiments, the data storage media 206 is configured to store information, data, content, applications, instructions, or the like, for enabling the sensing grid controller 106 to carry out various functions in accordance with example embodiments of the present disclosure.

The processor 202 may be embodied in a number of different ways. For example, in some example embodiments, the processor 202 includes one or more processing devices configured to perform independently. Additionally, or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the sensing grid controller 106, and/or one or more remote or "cloud" processor(s) external to the sensing grid controller 106.

In an example embodiment, the processor 202 is configured to execute instructions stored in the data storage media 206 or otherwise accessible to the processor. Alternatively, or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively, or additionally, as another example in some example embodiments, when the processor 202 is embodied as an executor of software instructions, the instructions specifically configure the processor 202 to perform the algorithms embodied in the specific operations described herein when such instructions are executed.

In some embodiments, the sensing grid controller 106 includes input/output circuitry 204 that provides output to the user and, in some embodiments, to receive an indication of a user input. In some embodiments, the input/output circuitry 204 is in communication with the processor 202 to provide such functionality. The input/output circuitry 204 may comprise one or more user interface(s) (e.g., user interface) and in some embodiments includes a display that comprises the interface(s) rendered as a web user interface, an application user interface, a user device, a backend system, or the like. The processor 202 and/or input/output circuitry 204 comprising the processor may be configured to control one or more functions of one or more user interface elements through computer program instructions (e.g., software and/or firmware) stored on a memory accessible to the processor (e.g., data storage media 206, and/or the like). In some embodiments, the input/output circuitry 204 includes or utilizes a user-facing application to provide input/output functionality to a client device and/or other display associated with a user.

In some embodiments, the sensing grid controller 106 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the sensing grid controller 106. In this regard, the communications circuitry 208 includes, for example in some embodiments, a network interface for enabling communications with a wired or wireless communications network. Additionally, or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the sensing grid controller 106.

Additionally, or alternatively, in some embodiments, one or more of the sets of circuitry 202-208 are combinable. Additionally, or alternatively, in some embodiments, one or more of the sets of circuitry perform some or all of the functionality described associated with another component. For example, in some embodiments, one or more sets of circuitry 202-208 are combined into a single module embodied in hardware, software, firmware, and/or a combination thereof.

Referring now to FIG. 3, an example mutual capacitance sensing grid 104 is provided. As depicted in FIG. 3, the example mutual capacitance sensing grid 104 includes a plurality of electrode pairs 330, each electrode pair comprising a transmitting electrode 332 and a receiving electrode. As further depicted in FIG. 3, the mutual capacitance sensing grid 104 is electrically coupled to a capacitive sensing IC 102 comprising mutual sensing transmission data lines 336 and mutual sensing receiving data lines 338. The mutual sensing transmission data lines 336 are configured to transmit sensing signals 339*a* (e.g., TX0-TX5) to each row of the electrode pairs 330 sequentially. The mutual sensing receiving data lines 338 are configured to receive returned sensing signals 339*b* from each receiving electrode pair 330 in the row of electrode pairs 330 simultaneously.

As depicted in FIG. 3, the example mutual capacitance sensing grid 104 includes a plurality of electrode pairs 330 arranged in a two-dimensional grid. An electrode pair 330 comprises any combination of two or more conductive surfaces insulated by a dielectric medium. The conductive surfaces may comprise conductive wires, strips, plates, or other material at which an electric charge may accumulate. The dielectric may be any insulating or semi-insulating material such as air, oxide, glass, ceramic, paper, plastic, semiconductor, doped semiconductor, and so on.

As depicted in FIG. 3, the electrode pair 330 comprises a transmitting electrode 332 and a receiving electrode 334. The transmitting electrode 332 comprises one or more electrodes of an electrode pair 330 electrically coupled to a transmission line of the capacitive sensing IC 102 (e.g., mutual sensing transmission data line 336) and configured to receive one or more sensing signals 339*a*. In some embodiments, the transmitting electrode 332 may be configured to accumulate charge and/or electrons on the surface of the transmitting electrode 332 proximate the corresponding receiving electrode 334.

The receiving electrode 334 comprises one or more electrodes of an electrode pair 330 electrically coupled to a receiving line of the capacitive sensing IC 102 (e.g., mutual sensing receiving data line 338) and configured to generate one or more returned sensing signals 339*b* based on the charge at the conductive surfaces at the electrode pair 330. The receiving electrode 334 accumulates a charge opposite the surface of the transmitting electrode 332 proximate the receiving electrode 334. For example, in an instance in which negative charge collects at the transmitting electrode 332, positive charge collects at the receiving electrode 334, creating an electric field between the transmitting electrode 332 and the receiving electrode 334.

A sensing value exists between the transmitting electrode 332 and the receiving electrode 334 of an electrode pair 330. A sensing value comprises any electrical characteristic related to the difference in charge at each electrode of the electrode pair. In some embodiments, a conductive object (such as a finger, hand, or pointing device) positioned near an electrode pair 330 attracts a portion of the charge from the transmitting electrode 332. Thus, the electric field between the transmitting electrode 332 and the receiving electrode 334 may be affected. In some examples, a sensing value may represent the capacitance of the electrode pair 330. In another example, the sensing value may represent the charge at the receiving electrode 334 and/or the transmitting electrode 332. In another example, the sensing value may represent the charge difference between the receiving electrode 334 and the transmitting electrode 332. In another example, the sensing value may represent the voltage and/or electric field between the receiving electrode 334 and the transmitting electrode 332.

During operation, the sensing value between the transmitting electrode 332 and the receiving electrode 334 of an electrode pair 330 may change, for example, due to the presence of a finger or other conductive material proximate the electrode pair 330. The sensing value between each electrode pair 330 comprising the mutual capacitance sensing grid 104 may be measured by the capacitive sensing IC 102 utilizing any technique to determine the electrical characteristics associated with the electrode pair 330.

As further depicted in FIG. 3, the plurality of electrode pairs 330 are arranged in a two-dimensional mutual capacitance sensing grid 104. As depicted in FIG. 3, the mutual capacitance sensing grid 104 comprises a plurality of electrode pairs 330 arranged in a series of rows and columns. The two-dimensional grid pattern of the mutual capacitance sensing grid 104 enables the mutual capacitance sensing grid 104 to substantially cover a surface, creating a mutual capacitance touch-sensitive surface 100. In addition, the two-dimension pattern of the mutual capacitance sensing grid 104 enables a change in capacitance at one or more of the electrode pairs 330 to be correlated with an x, y location on the surface of the mutual capacitance touch-sensitive surface. Such an x, y location may be used as an input to an electronic device comprising the mutual capacitance touch-sensitive surface. A two-dimensional mutual capacitance sensing grid 104 may also enable the detection of multiple simultaneous touch events.

As further depicted in FIG. 3, the capacitive sensing IC 102 comprises a mutual sensing transmission data line 336 and a mutual sensing receiving data line 338. The mutual sensing transmission data line 336 comprises any circuitry including hardware and/or software configured to generate a sensing signal 339*a* for each row of electrode pairs 330 in the mutual capacitance sensing grid 104. For example, as depicted in FIG. 3, the first six rows of an example mutual capacitance sensing grid 104 are shown. The mutual sensing transmission data line 336 includes a transmission data line TX0, TX1, TX2, TX3, TX4, TX5 for separately transmitting sensing signals 339*a* to each of the first six rows.

A sensing signal 339*a* is any electrical signal configured to generate a measurable charge at the transmitting electrode of each electrode pair 330 of the corresponding row of electrode pairs. For example, a sensing signal 339*a* may be an electrical pulse transmitted to the row of electrode pairs 330 using a transmission data line TX0, TX1, TX2, TX3, TX4, TX5. An electrical pulse may be a rapid change in the amplitude of the sensing signal 339*a* associated with the row of electrode pairs 330. The sensing signal 339*a* for a particular row of electrode pairs 330 may be received at each electrode pair 330 comprising the row of electrode pairs 330 simultaneously. As further depicted in FIG. 3, the sensing signal 339*a* may be transmitted sequentially one row at a time. For example, the sensing signal 339*a* may be asserted for the first row of electrode pairs 330 on the first transmission data line TX0 during a first time period; for the second row of electrode pairs 330 on the second transmission data line TX1 during a second time period; and so on until the sensing signal 339*a* has been asserted on all rows of electrode pairs 330 in the mutual capacitance sensing grid 104. By transmitting the sensing signal 339*a* to each row comprising the mutual capacitance sensing grid 104 sequentially and measuring the sensing value for each electrode pair 330 in the row of electrode pairs simultaneously, the capacitive sensing IC 102 may rapidly determine the sensing value of every electrode pair 330 in the mutual capacitance sensing grid 104.

The mutual sensing receiving data line 338 comprises any circuitry including hardware and/or software configured to receive a returned sensing signal 339*b* for each column of electrode pairs 330 in a mutual capacitance sensing grid 104. For example, as depicted in FIG. 3, the first nine columns of an example mutual capacitance sensing grid 104 are shown. The mutual sensing receiving data line 338 comprises a receiving data line RX0, RX1, RX2, RX3, RX4, RX5, RX6, RX7, RX8 for each column of electrode pairs 330 of the first nine columns.

A returned sensing signal 339*b* is any electrical signal received at the mutual sensing receiving data line 338 in response to a sensing signal 339*a* transmitted by the mutual sensing transmission data line 336, indicating one or more electrical characteristics of the electrode pair 330 common to both the transmission data line TX0, TX1, TX2, TX3, TX4, TX5 on which the sensing signal 339*a* was transmitted, and the receiving data line RX0, RX1, RX2, RX3, RX4, RX5, RX6, RX7, RX8 on which the returned sensing signal 339*b* is measured. In an instance in which a sensing signal 339*b* is transmitted to a particular transmitting electrode 332 of an electrode pair, the electrical properties at the surface of the transmitting electrode 332 may change, for example, negative charge may be pushed to the surface of the transmitting electrode 332. The increase in negative charge at the surface of the transmitting electrode 332 may pull positive charge to the surface of the corresponding receiving electrode 334 in the electrode pair 330. Such a change in electrical properties may be measured in the corresponding receiving data line RX0, RX1, RX2, RX3, RX4, RX5, RX6, RX7, RX8. Thus, a sensing value of an electrode pair may be measured by sending a sensing signal 339*a* and measuring the electrical properties of the corresponding returned sensing signal 339*b* received at the mutual sensing receiving data line 338.

As depicted in FIG. 3, the mutual sensing receiving data line 338 is configured to receive the returned sensing signal 339*b* for each electrode pair 330 in a particular row of electrode pairs 330 simultaneously. By transmitting the sensing signal 339*a* sequentially, one row at a time, and receiving the corresponding returned sensing signal 339*b* simultaneously, the capacitive sensing IC 102 may determine the sensing value at each electrode pair in the mutual capacitance sensing grid 104.

Figure 4:
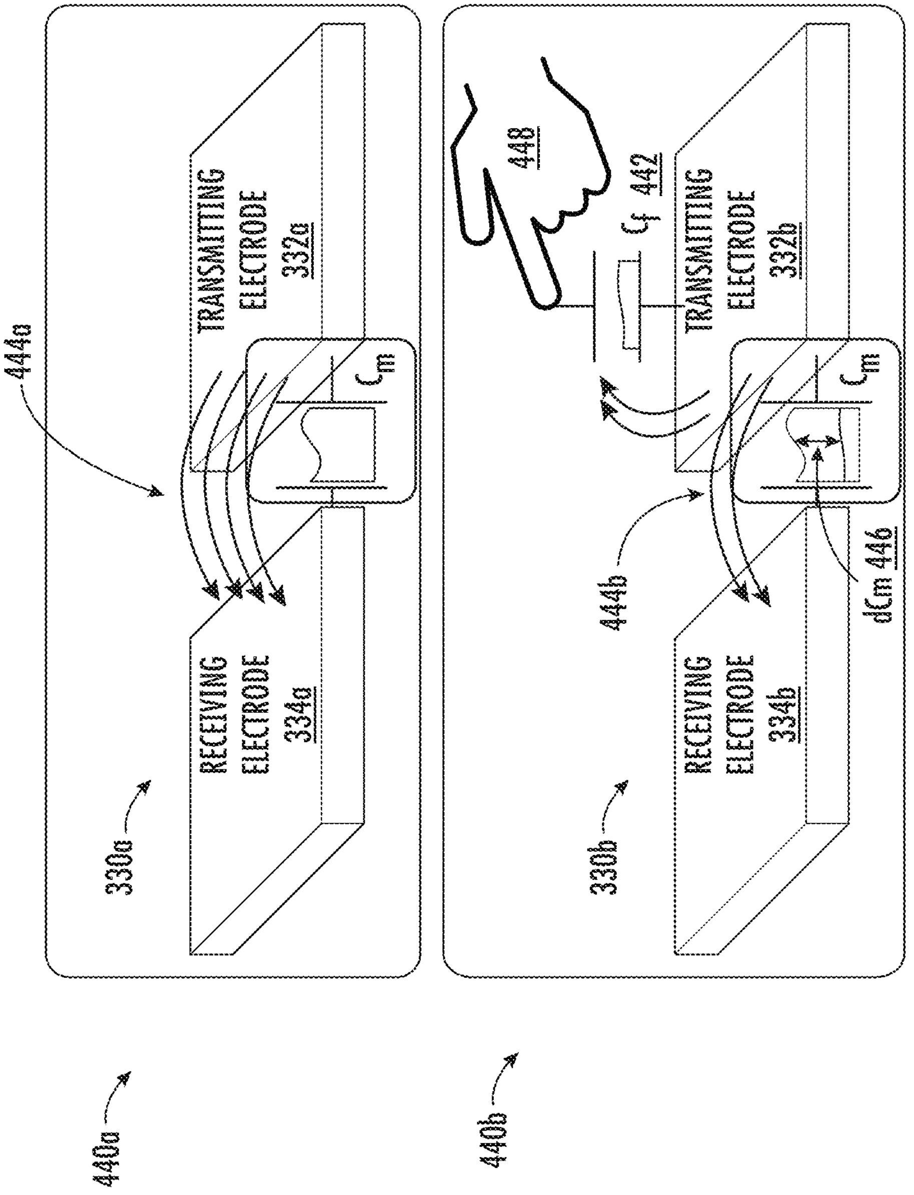
FIG. 4 depicts an example touch event at an electrode pair of a touch-sensitive surface in accordance with an example embodiment of the present disclosure.

Referring now to FIG. 4, an example touch event 440 at an example electrode pair 330*a*, 330*b* is depicted. As depicted in FIG. 4, a sensing value 444*a*, 444*b* may represent an electrical characteristic corresponding to the capacitance between the transmitting electrode 332*a*, 332*b* and the receiving electrode 334*a*, 334*b* of an electrode pair 330*a*, 330*b*. As depicted in FIG. 4, in some embodiments, the sensing value 444*a*, 444*b* may correspond to the measured capacitance between the two plates.

As depicted in FIG. 4, a sensing value 444*a* is measured during an untouched state 440*a*. An untouched state 440*a* is any state in which the sensing value 444*a* of an electrode pair 330*a* is unaffected by the presence of a foreign conductive object (e.g., conductive object 448). An ambient sensing value may be determined in an instance in which the sensing value 444*a* is measured during an untouched state 440*a*. Each electrode pair of a mutual capacitance sensing gird may comprise a different ambient sensing value based on the varying electrical properties of the electrode pair. Varying electrical properties may include the resistance of the various electrical components, including the dielectric or medium separating the transmitting electrode and receiving electrode; the parasitic capacitances of the electrode pair; the conductivity of the conductive elements; and so on. An ambient sensing value may be measured during manufacturing, and/or in any instance in which a foreign conductive object is not proximate the electrode pair. As described herein, the ambient sensing value may be used to determine an adapted touch strength based on the measure touch strength during operation. The adapted touch strength may compensate for varying electrical properties due to differences in electrical properties, resulting in inconsistent or inaccurate measurements on a mutual capacitance touch-sensitive surface.

Differences in electrical properties may based on fabrication of the mutual capacitance touch-sensitive surface; size of the electrodes; size of the mutual capacitance sensing grid; the grid pattern; the conductive materials used; the location of the electrode pair on the mutual capacitance touch-sensitive surface; and so on. Differences in electrical properties of electrodes may lead to differences in strength measurements and/or sensitivity, based on the particular electrical properties of the electrode. For example, touches on the screen having identical strength may register different strength measurements based on the electrical properties of the electrodes. Differences in sensitivity may affect the accuracy and consistency of a mutual capacitance touch-sensitive surface.

As further depicted in FIG. 4, a touch event 440*b* occurs in an instance in which a conductive object 448 is placed in contact and/or proximate one or more electrode pairs 330*b* comprising a mutual capacitance touch-sensitive surface. As depicted in the touch event 440*b* of FIG. 4, the presence of a conductive object 448 proximate the electrode pair 330*b* effects the electrical circuit and thus the sensing value 444*b* between the transmitting electrode 332*b* and the receiving electrode 334*b*. For example, as depicted in FIG. 4, the presence of a conductive object 448 draws a portion of the electrical charge at the transmitting electrode 332*b* toward the conductive object 448. Drawing a portion of the electrical charge toward the conductive object 448 and away from the receiving electrode 334*b* changes the sensing value 444*b* measured at the capacitive sensing IC (e.g., capacitive sensing IC 102). The change in sensing value 446 may be detected at the sensing grid controller (e.g., sensing grid controller 106). Thus, a touch event 440*b* may be determined based on the change in sensing value 446 between the transmitting electrode 332*b* and receiving electrode 334*b*. In addition, a touch strength may be measured based on the change in sensing value 446, as further described in relation to FIG. 6.

Figure 5:
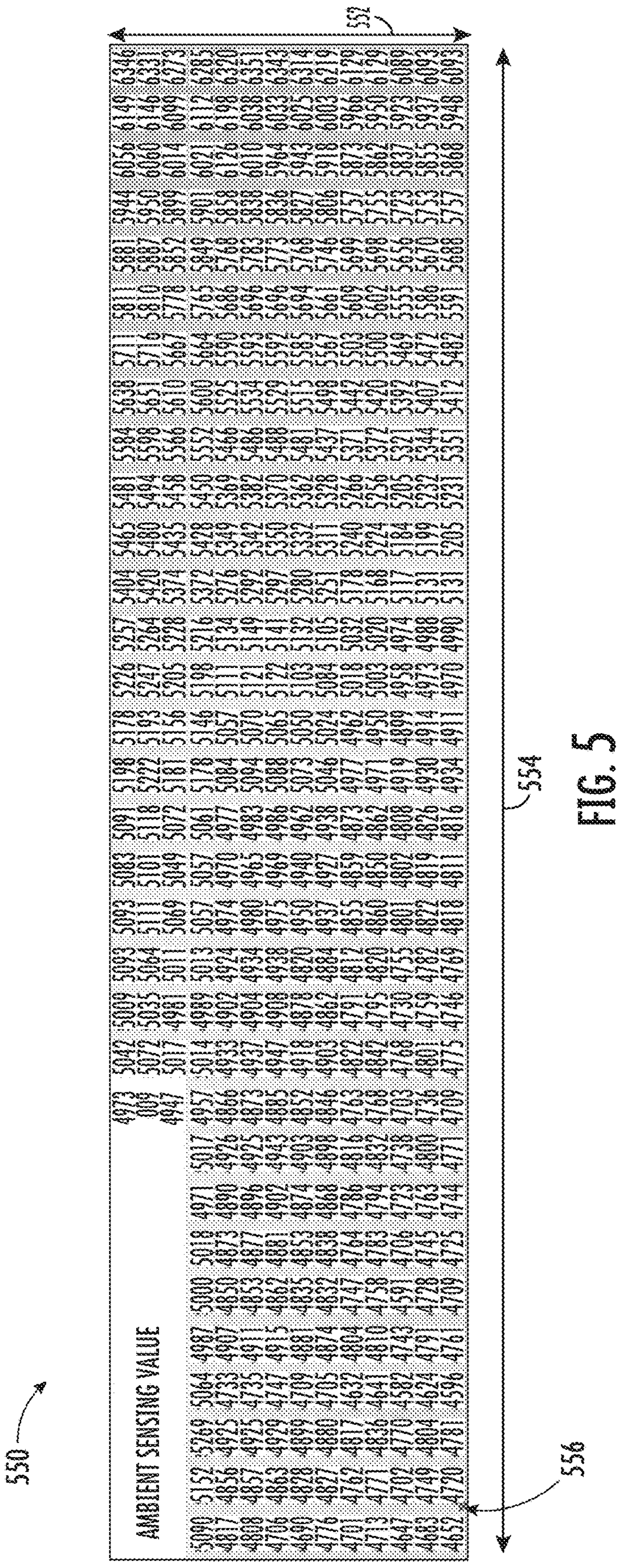
FIG. 5 illustrates an example ambient sensing value table corresponding to a touch-sensitive surface in accordance with an example embodiment of the present disclosure.

Referring now to FIG. 5, an example ambient sensing value table 550 is provided. As depicted in FIG. 5, the example ambient sensing value table 550 includes rows 552 corresponding to the number of rows of electrode pairs in an example mutual capacitance sensing grid (e.g., mutual capacitance sensing grid 104). The example ambient sensing value table 550 further includes columns 554 corresponding to the number of columns of electrode pairs in an example mutual capacitance sensing grid. Thus, each ambient sensing value entry 556 corresponds with an electrode pair in the mutual capacitance sensing grid.

As described herein, a mutual capacitance touch-sensitive surface may be configured to determine an ambient sensing value for each electrode pair (e.g., electrode pair 330) comprising a mutual capacitance sensing grid. The ambient sensing value for each electrode pair may be determined in any instance in which the mutual capacitance touch-sensitive surface is in an untouched state, meaning, no foreign conductive objects are proximate the mutual capacitance touch-sensitive surface. For example, ambient sensing values may be determined during the manufacturing process of the mutual capacitance touch-sensitive surface or associated electronic device (e.g., mobile phone, tablet, personal computer, appliance, etc.).

Ambient sensing values for each electrode pair may be determined by transmitting a sensing signal (e.g., sensing signal 339*a*) to each row of electrode pairs sequentially on the transmission data lines (e.g., one row at a time). The corresponding returned sensing signals (e.g., returned sensing signals 339*b*) are subsequently received at the capacitive sensing IC 102 simultaneously on each of the receive data lines. The sensing value measured at each receive data line is stored in a memory location of the ambient sensing value table 550 corresponding to the row and column of the electrode pair.

Figure 6:
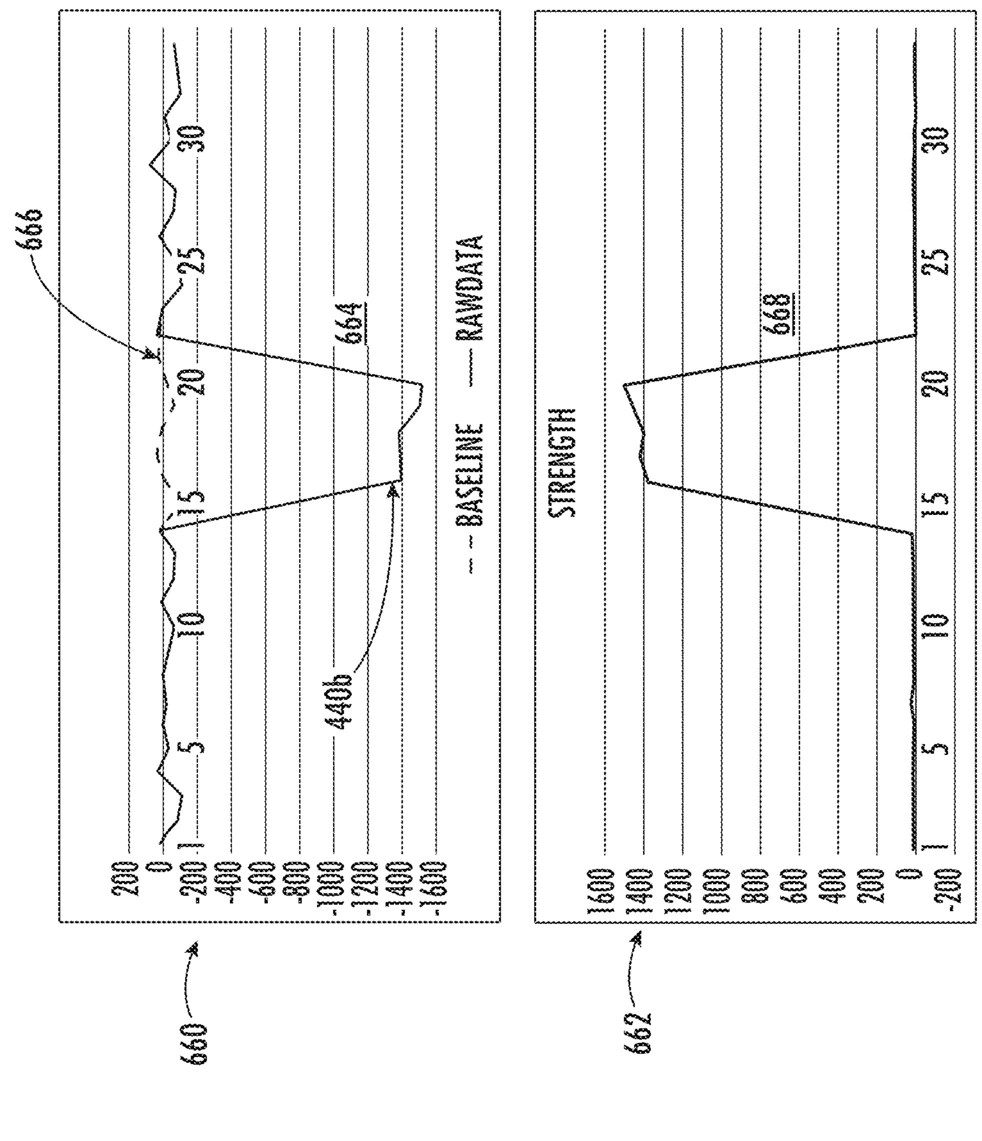
FIG. 6 depicts example charts illustrating a touch strength determination in accordance with an example embodiment of the present disclosure.

Referring now to FIG. 6, an example chart 660 illustrating a raw sensing value 664 and a baseline sensing value 666 is depicted. A raw sensing value 664 is any number, value, or other data representing a measurement of a sensing value at a particular electrode pair. During operation of a mutual capacitance touch-sensitive surface, the sensing value at each electrode is periodically measured to determine a raw sensing value 664. The raw sensing value 664 may directly correspond to an electrical property of the electrode pair at the time of measurement. For example, the raw sensing value may be the capacitance of the electrode pair, the charge of the receiving electrode, the charge of the transmitting electrode, the electric field of the electrode pair, the voltage across the electrode pair, the current received in the returned sensing signal, or other similar measurements. Thus, the raw sensing value 664 may change in an instance in which a conductive object is placed near the electrode. For example, if a raw sensing value 664 represents the capacitance of an electrode pair, in an instance in which a conductive object is brought near to the electrode pair, the capacitance of the electrode pair will go down. Changes in the raw sensing value 664 of an electrode pair may indicate a touch event.

As further illustrated in the example chart 662*a* mutual capacitance touch-sensitive surface may be configured to determine a baseline sensing value 666. A baseline sensing value 666 is any number, value, or other data indicating a typical sensing value for a particular electrode pair. In some embodiments, the baseline sensing value 666 may be determined based on historical sensing values for the electrode pair. For example, a set of historical raw sensing values 664 may be stored and updated each time the raw sensing value 664 is determined. A baseline sensing value 666 may be determined based on a statistical measurement of the historical raw sensing values 664. For example, by averaging the raw sensing values 664 over a period of time.

Once a baseline sensing value 666 is determined for a particular electrode pair at a particular time, a touch event 440*b* may be recognized. A touch event 440*b* may be detected based on a deviation of the raw sensing value 664 from the baseline sensing value 666. For example, as depicted in FIG. 6, in an instance in which the raw sensing value 664 drops below a determined threshold, a touch event 440*b* may be indicated.

An example chart 662, illustrating a touch strength 668 is further depicted in FIG. 6. The amount of deviation of the raw sensing value 664 may be directly correlated to the strength or force of the touch event 440*b*. The touch strength 668 represents the difference between the raw sensing value 664 and the baseline sensing value 666. The touch strength 668 may be utilized by an electronic device comprising a mutual capacitance touch-sensitive surface to further improve the accuracy of a touch identification. The electronic device may further utilize the touch strength 668 to distinguish between hard and soft presses on the mutual capacitance touch-sensitive surface. In addition, the touch strength 668 may be compared from different locations on the mutual capacitance touch-sensitive surface to determine relative touch strength. However, the touch strength 668 may vary from electrode to electrode based on the electrical properties of the electrode. Such electrical properties may result in inconsistencies in the detection and evaluation of touch strength 668 across a mutual capacitance touch-sensitive surface.

Figure 7A:
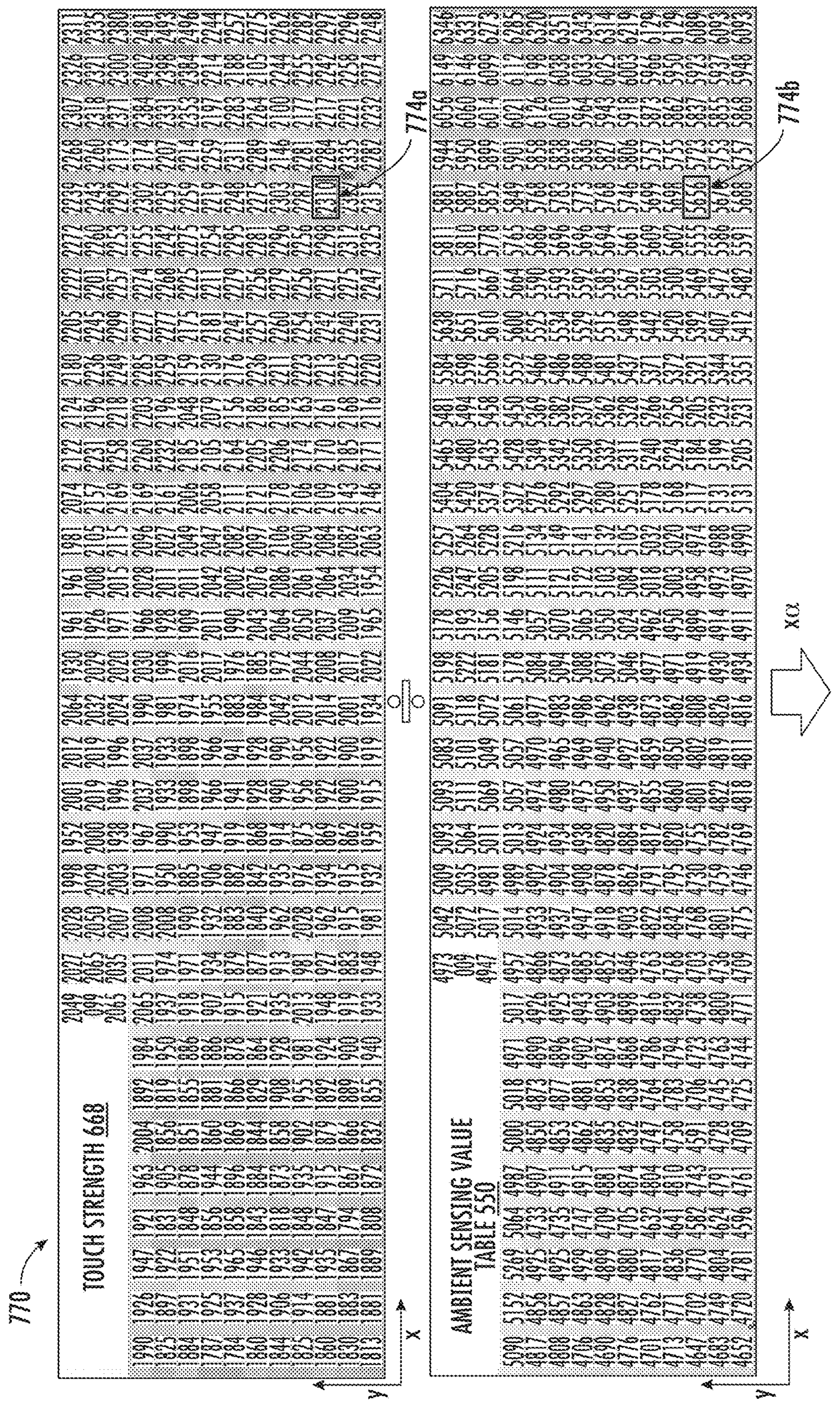
FIG. 7A-FIG. 7B illustrate an example determination of an adapted touch strength based on a touch strength and an ambient sensing value table corresponding to a touch-sensitive surface in accordance with an example embodiment of the present disclosure.
Figure 7B:
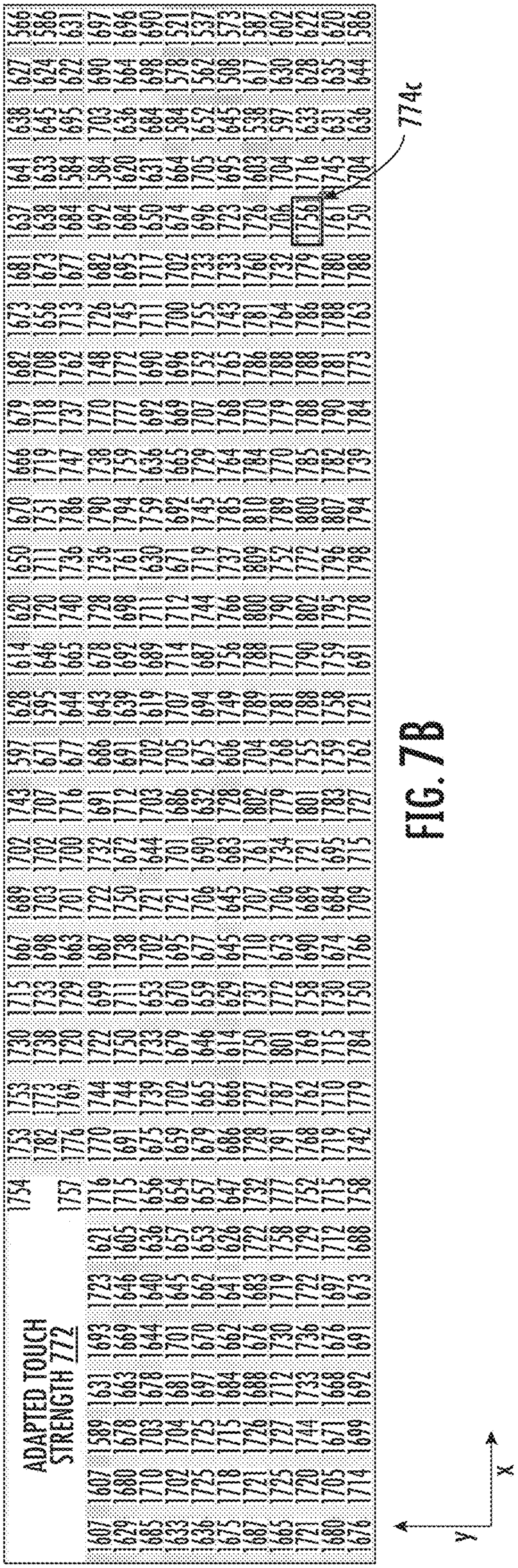

Referring now to FIG. 7A and FIG. 7B, an example flowchart 770 depicting the determination of an adapted touch strength 772 based on a touch strength 668 and an ambient sensing value table 550 is depicted.

In order to generate consistent and accurate touch strengths across the mutual capacitance touch-sensitive surface, a touch strength 668 may be adapted based on the ambient sensing value of the corresponding electrode to determine an adapted touch strength 772. As depicted in FIG. 7A, a touch strength 668 may be determined for each electrode based on a difference between a measured raw sensing value and a baseline sensing value for the particular electrode pair. Once a touch strength 668 is determined, the touch strength 668 may be adapted based on the ambient sensing value corresponding to the particular electrode pair in the ambient sensing value table 550. Any technique may be used to adjust the touch strength 668 based on the ambient sensing value. For example, a mathematical operation may be performed on the touch strength 668 based on the ambient sensing value, such as addition, multiplication, subtraction, division, etc. As depicted in FIG. 7A and FIG. 7B, a mathematical equation (1) may be utilized to determine the adapted touch strength 772:

$$TS_{ADP}(x, y) = \frac{TS_{raw}(x, y)}{SV_{AMB}(x, y)} \cdot \alpha \tag{1}$$

where $TS_{ADP}(x, y)$ is the adapted touch strength 772 of the electrode pair in row y, column x of the mutual capacitance sensing grid; $TS_{raw}(x, y)$ is the un-adapted touch strength 668 measured at the electrode pair in row y, column x; $SV_{AMB}(x, y)$ is the ambient sensing value stored in the ambient sensing value table 550 for the electrode pair in row y, column x; and α is a constant factor for adjusting the adapted touch strength.

For example, as shown in FIG. 7A, the touch strength 774*a* corresponds to a measured touch strength of the electrode pair at row 2 and column 27 in a 0-based index; and the ambient sensing value 774*b* corresponds to the ambient sensing value for the electrode pair at row 2, column 27. Thus, the adapted touch strength 774*c* shown in FIG. 7B may be determined according to Equation (1) based on the touch strength 774*a* and the ambient sensing value 774*b* for the particular electrode pair:

$$TS_{ADP}(27, 2) = \frac{TS_{raw}(27, 2)}{SV_{AMB}(27, 2)} \cdot \alpha = \frac{2310}{5656} \cdot 4300 = 1756$$

Thus, the adapted strength of the for the electrode pair in row 2, column 27 is 1756.

Figure 8:
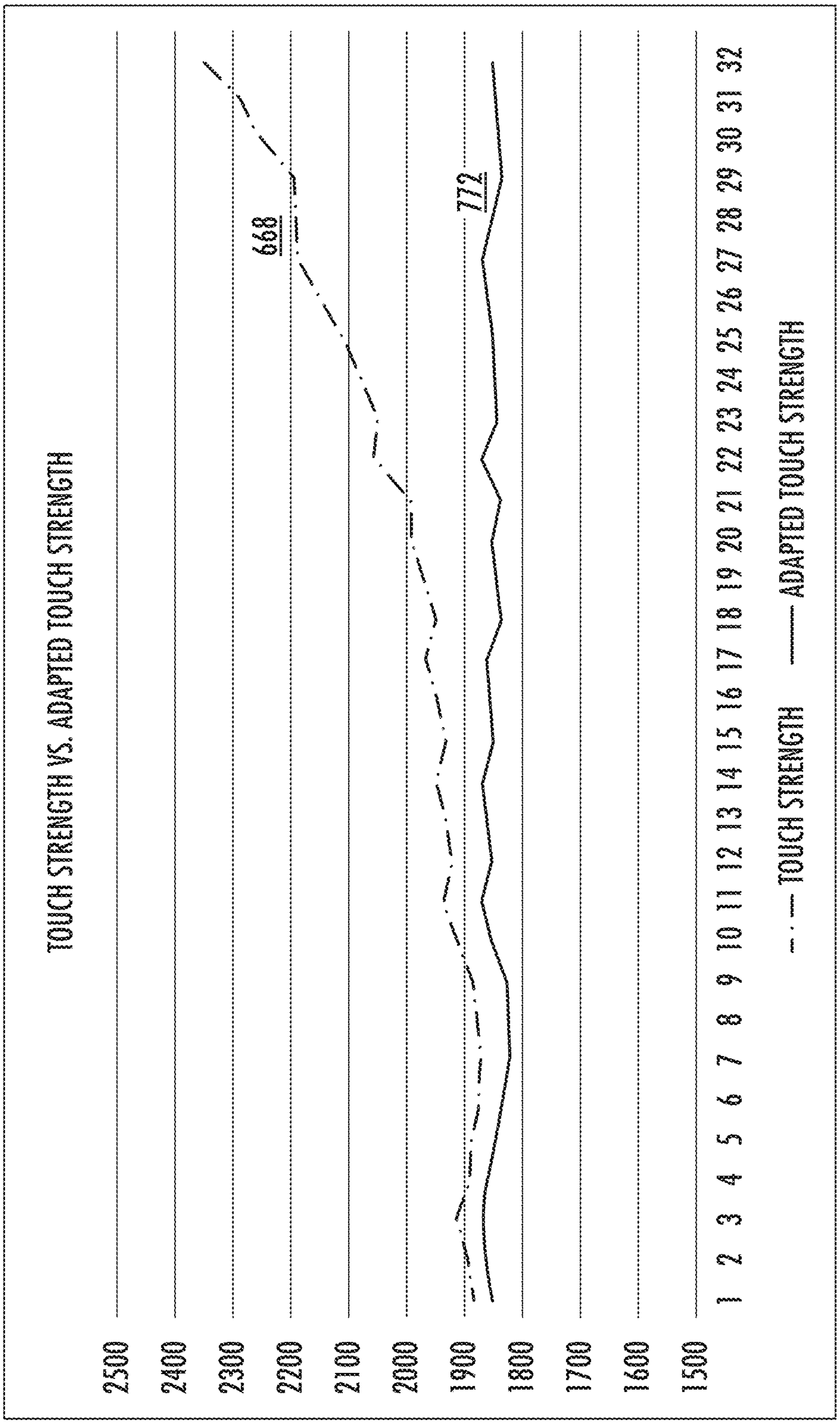
FIG. 8 depicts an example chart illustrating a touch strength relative to an adapted touch strength in accordance with an example embodiment of the present disclosure.

Referring now to FIG. 8, an example chart 880 illustrating a touch strength 668 relative to an adapted touch strength 772 is depicted. As depicted in FIG. 8, the example chart 880 illustrates various touch events of identical strength performed at various points across a mutual capacitance touch-sensitive surface. The touch strength 668 determined before an adjustment based on an ambient sensing value varies significantly based on the particular electrode pair and the position of the electrode pair in the mutual capacitance touch-sensitive surface. However, as further depicted in FIG. 8, the adapted touch strength 772 which is adapted based on the ambient sensing value of the corresponding electrode pair is consistent regardless of the position of the electrode pair within the mutual capacitance sensing grid, and the specific electrical properties of the electrode pair. Thus, an electronic device comprising a mutual capacitance touch-sensitive surface in accordance with the present disclosure may exhibit more consistent touch strengths and sensitivity across the mutual capacitance touch-sensitive surface.

Figure 9:
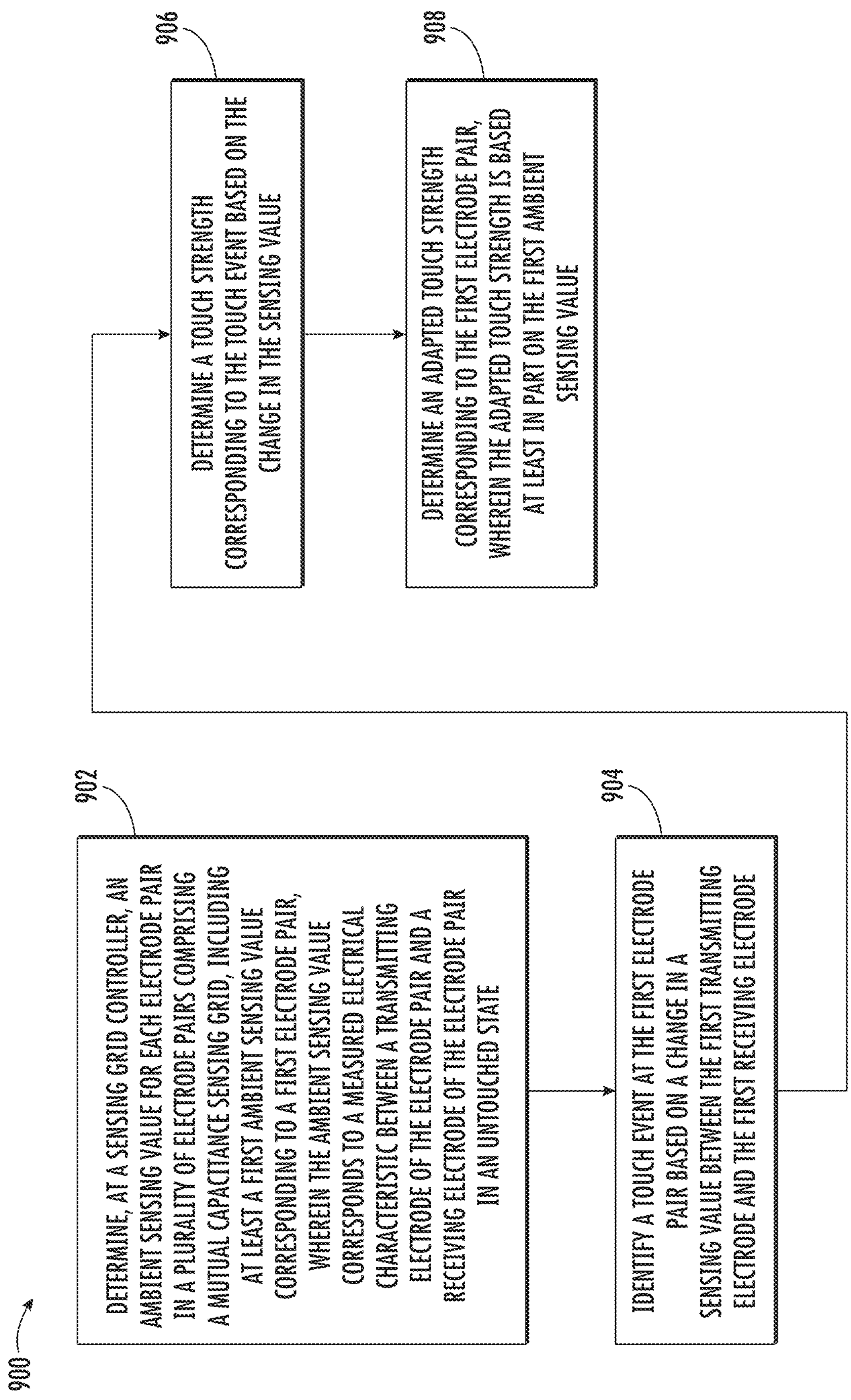
FIG. 9 illustrates a flowchart depicting a process for determining an adapted touch strength of a touch event at a mutual capacitance touch-sensitive surface in accordance with an example embodiment of the present disclosure.

Referring now to FIG. 9, an example flowchart depicting a process 900 for determining an adapted touch strength (e.g., adapted touch strength 772) of a touch event (e.g., touch event 440*b*) at a mutual capacitance touch-sensitive surface (e.g., mutual capacitance touch-sensitive surface 100) is provided. At block 902, a sensing grid controller (e.g., sensing grid controller 106) determines an ambient sensing value (e.g., ambient sensing value 774*b*) for each electrode pair (e.g., electrode pair 330) in a plurality of electrode pairs comprising a mutual capacitance sensing grid (e.g., mutual capacitance sensing grid 104), including at least a first ambient sensing value corresponding to a first electrode pair, wherein the ambient sensing value corresponds to a measured electrical characteristic between a transmitting electrode (e.g., transmitting electrode 332) of the electrode pair and a receiving electrode (e.g., receiving electrode 334) of the electrode pair in an untouched state (e.g., untouched state 440*a*). As described herein, an ambient sensing value may be determined in an instance in which the electrical properties of the electrode pair are unaffected by the presence of a conductive object. In some embodiments, the ambient sensing values are determined during manufacturing and stored in a memory device accessible by the sensing grid controller. The ambient sensing values may be accessed according to the row and column of the corresponding electrode pair.

At block 904, the sensing grid controller identifies a touch event at the first electrode pair based on a change in a sensing value between the first transmitting electrode and the first receiving electrode. In some embodiments, a touch event may be determined based on a comparison of the raw sensing value (e.g., raw sensing value 664) to a baseline sensing value (e.g., baseline sensing value 666). In an instance in which a difference between the raw sensing value and the baseline sensing value exceeds a determined threshold, a touch event may be detected.

At block 906, the sensing grid controller determines a touch strength (e.g., touch strength 668) corresponding to the touch event based on the change in the sensing value. In some embodiments, the touch strength may correspond to a difference between the raw sensing value and the baseline sensing value. A touch strength determined based on a difference between the raw sensing value and the baseline sensing value may be susceptible to sensitivity variation based on the position of the electrode pair within the mutual capacitance sensing grid and the electrical characteristics of the electrode pair.

At block 908, the sensing grid controller determines an adapted touch strength corresponding to the first electrode pair, wherein the adapted touch strength is based at least in part on the first ambient sensing value. The touch strength measured at a particular electrode pair may be adapted based on the ambient sensing value specific to the electrode pair. Any technique may be used to tune the touch strength based on the ambient sensing value. For example, the adapted touch strength may be expressed as the quotient of the touch strength and the ambient sensing value.

While this detailed description has set forth some embodiments of the present invention, the appended claims cover other embodiments of the present invention which differ from the described embodiments according to various modifications and improvements. For example, one skilled in the art may recognize that such principles may be applied to any electronic device utilizing a touchscreen interface. For example, a mobile phone, personal computer, laptop, tablet, monitor, appliances, interactive kiosk, or other touch-enabled device.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:

a mutual capacitance sensing grid, comprising a plurality of electrode pairs, each electrode pair comprising a transmitting electrode and a receiving electrode, including at least a first electrode pair comprising a first transmitting electrode and a first receiving electrode;

a sensing grid controller electrically coupled to the mutual capacitance sensing grid, comprising one or more processors and one or more storage devices storing instructions that are operable when executed by the one or more processors to:

determine an ambient sensing value for each electrode pair in the plurality of electrode pairs, including at least a first ambient sensing value corresponding to the first electrode pair, wherein the ambient sensing value corresponds to a measured electrical characteristic between the transmitting electrode and the receiving electrode in an untouched state;

store the first ambient sensing value associated with the first electrode pair in an ambient sensing value table;

determine a baseline sensing value for the first electrode pair based at least in part on a plurality of historical sensing values for the first electrode pair;

identify a touch event at the first electrode pair based on a change in a sensing value between the first transmitting electrode and the first receiving electrode relative to the baseline sensing value, wherein the touch event is identified in an instance in which the change in the sensing value exceeds a determined threshold;

determine a touch strength corresponding to the touch event based on the change in the sensing value;

access the first ambient sensing value associated with the first electrode pair from the ambient sensing value table; and determine an adapted touch strength corresponding to the first electrode pair, wherein the adapted touch strength is based at least in part on a ratio of the touch strength and the first ambient sensing value.

2. The apparatus of claim 1, wherein the measured electrical characteristic corresponds to a capacitance between the transmitting electrode and the receiving electrode.

3. The apparatus of claim 2, wherein the plurality of historical sensing values for the first electrode pair are measured in an untouched state.

4. The apparatus of claim 3, wherein the baseline sensing value comprises an average of the plurality of historical sensing values for the first electrode pair.

5. The apparatus of claim 4, wherein the sensing value corresponds to a capacitance between the first transmitting electrode and the first receiving electrode.

6. The apparatus of claim 3, wherein the sensing grid controller is configured to:

determine a raw sensing value corresponding to the sensing value of the first electrode pair, wherein the touch strength of the touch event of the first electrode pair is a difference between the raw sensing value and the baseline sensing value.

7. The apparatus of claim 1, wherein the plurality of electrode pairs of the mutual capacitance sensing grid are configured in one or more electrode pair rows and one or more electrode pair columns.

8. The apparatus of claim 7, wherein the mutual capacitance sensing grid comprises at least:

a first electrode pair row comprising one or more first row electrode pairs of the plurality of electrode pairs; and a second electrode pair row comprising one or more second row electrode pairs of the plurality of electrode pairs.

9. The apparatus of claim 8, further comprising:

a mutual sensing transmit data line electrically coupled to the mutual capacitance sensing grid and the sensing grid controller;

wherein the sensing grid controller is further configured to:

cause the mutual sensing transmit data line to transmit a first electrical pulse to each of the one or more first row electrode pairs during a first time period, and cause the mutual sensing transmit data line to transmit a second electrical pulse to each of the one or more second row electrode pairs during a second time period.

10. The apparatus of claim 9, further comprising:

a mutual sensing receive data line electrically coupled to the mutual capacitance sensing grid and the sensing grid controller;

wherein the sensing grid controller is further configured to:

receive, from the mutual sensing receive data line, the first electrical pulse from each of the one or more first row electrode pairs during the first time period, and receive, from the mutual sensing receive data line, the second electrical pulse from each of the one or more second row electrode pairs during the second time period.

11. The apparatus of claim 7, wherein a location of the touch event is determined based on the sensing value of each electrode pair in the plurality of electrode pairs.

12. A computer-implemented method for determining an adapted touch strength of a touch event at a mutual capacitance touch-sensitive surface, the computer-implemented method comprising:

determining, at a sensing grid controller, an ambient sensing value for each electrode pair in a plurality of electrode pairs comprising a mutual capacitance sensing grid, including at least a first ambient sensing value corresponding to a first electrode pair, wherein the ambient sensing value corresponds to a measured electrical characteristic between a first transmitting electrode of the electrode pair and a first receiving electrode of the electrode pair in an untouched state;

storing the first ambient sensing value associated with the first electrode pair in an ambient sensing value table;

determining a baseline sensing value for the first electrode pair based at least in part on a plurality of historical sensing values for the first electrode pair;

identifying the touch event at the first electrode pair based on a change in a sensing value between the first transmitting electrode and the first receiving electrode relative to the baseline sensing value, wherein the touch event is identified in an instance in which the change in the sensing value exceeds a determined threshold;

determining a touch strength corresponding to the touch event based on the change in the sensing value;

accessing the first ambient sensing value associated with the first electrode pair from the ambient sensing value table; and determining the adapted touch strength corresponding to the first electrode pair, wherein the adapted touch strength is based at least in part on a ratio of the touch strength and the first ambient sensing value.

13. The computer-implemented method of claim 12, wherein the plurality of historical sensing values for the first electrode pair are measured in an untouched state.

14. The computer-implemented method of claim 12, wherein the sensing value and the ambient sensing value correspond to a capacitance between the first transmitting electrode and the first receiving electrode.

15. The computer-implemented method of claim 13, further comprising:

determining a raw sensing value corresponding to the sensing value of the first electrode pair, wherein the touch strength of the touch event of the first electrode pair is a difference between the raw sensing value and the baseline sensing value.

16. The computer-implemented method of claim 12, wherein the plurality of electrode pairs of the mutual capacitance sensing grid are configured in one or more electrode pair rows and one or more electrode pair columns, comprising at least:

a first electrode pair row comprising one or more first row electrode pairs of the plurality of electrode pairs; and a second electrode pair row comprising one or more second row electrode pairs of the plurality of electrode pairs; and wherein the computer-implemented method further comprises:

causing a mutual sensing transmit data line to transmit a first electrical pulse to each of the one or more first row electrode pairs during a first time period, wherein the mutual sensing transmit data line is electrically coupled to the mutual capacitance sensing grid and the sensing grid controller;

causing the mutual sensing transmit data line to transmit a second electrical pulse to each of the one or more second row electrode pairs during a second time period;

receiving, from a mutual sensing receive data line, the first electrical pulse from each of the one or more first row electrode pairs during the first time period, wherein the mutual sensing receive data line is electrically coupled to the mutual capacitance sensing grid and the sensing grid controller; and receiving, from the mutual sensing receive data line, the second electrical pulse from each of the one or more second row electrode pairs during the second time period.

17. The computer-implemented method of claim 16, wherein a location of the touch event is determined based on the sensing value of each electrode pair in the plurality of electrode pairs.

18. An electronic device, comprising:

a touch-sensitive surface, the touch-sensitive surface comprising:

a mutual capacitance sensing grid, comprising a plurality of electrode pairs, each electrode pair comprising a transmitting electrode and a receiving electrode, including at least a first electrode pair comprising a first transmitting electrode and a first receiving electrode;

a sensing grid controller electrically coupled to the mutual capacitance sensing grid, comprising one or more processors and one or more storage devices storing instructions that are operable when executed by the one or more processors to:

determine an ambient sensing value for each electrode pair in the plurality of electrode pairs, including at least a first ambient sensing value corresponding to the first electrode pair, wherein the ambient sensing value corresponds to a measured electrical characteristic between the transmitting electrode and the receiving electrode in an untouched state;

store the first ambient sensing value associated with the first electrode pair in an ambient sensing value table;

determine a baseline sensing value for the first electrode pair based at least in part on a plurality of historical sensing values for the first electrode pair;

identify a touch event at the first electrode pair based on a change in a sensing value between the first transmitting electrode and the first receiving electrode relative to the baseline sensing value, wherein the touch event is identified in an instance in which the change in the sensing value exceeds a determined threshold;

determine a touch strength corresponding to the touch event based on the change in the sensing value;

access the first ambient sensing value associated with the first electrode pair from the ambient sensing value table; and determine an adapted touch strength corresponding to the first electrode pair, wherein the adapted touch strength is based at least in part on a ratio of the touch strength and the first ambient sensing value.

* * * * *